Nov. 6, 1962  M. MILLHEISER  3,062,253
BOLT AND SHEAR SLEEVE WITH SHEAR SLEEVE RETRACTING MEANS
Filed Aug. 26, 1958  2 Sheets-Sheet 1
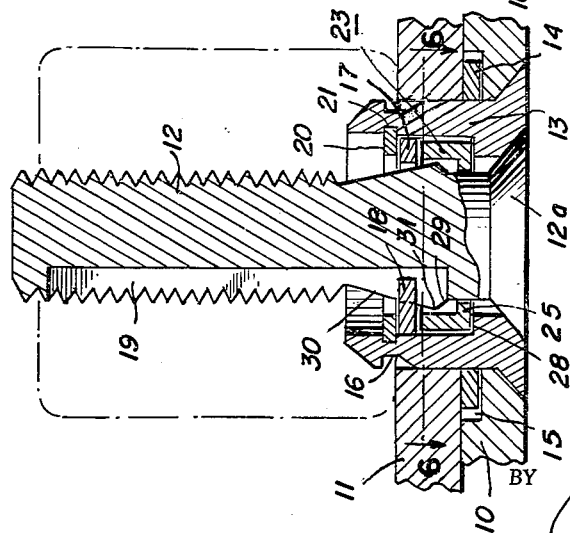
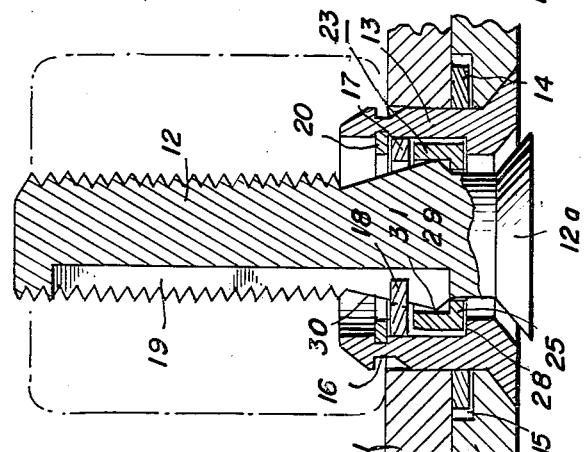
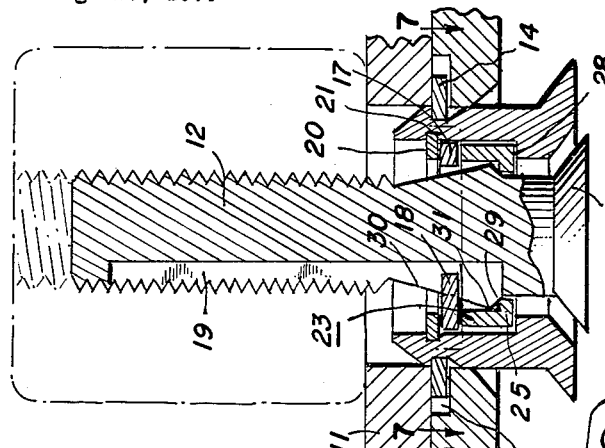
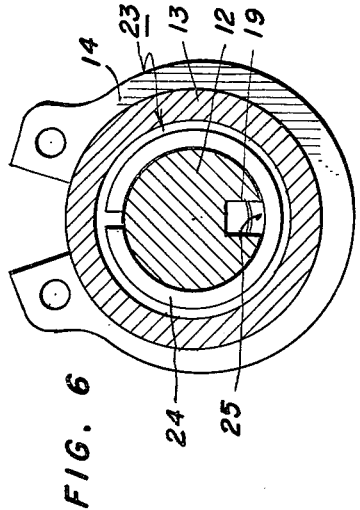
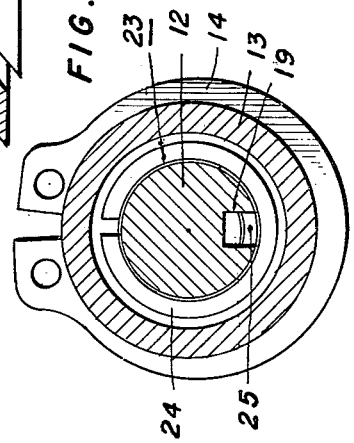
INVENTOR
MELVIN MILLHEISER
BY  *J. Harold Kilcoyne*
ATTORNEY Nov. 6, 1962  M. MILLHEISER  3,062,253
BOLT AND SHEAR SLEEVE WITH SHEAR SLEEVE RETRACTING MEANS
Filed Aug. 26, 1958  2 Sheets-Sheet 2
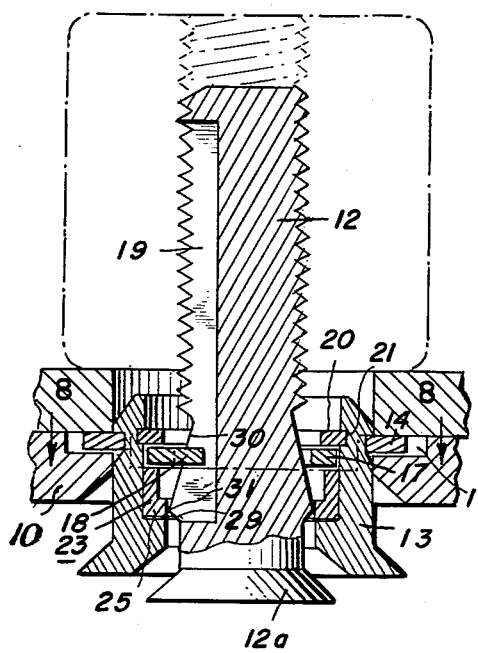
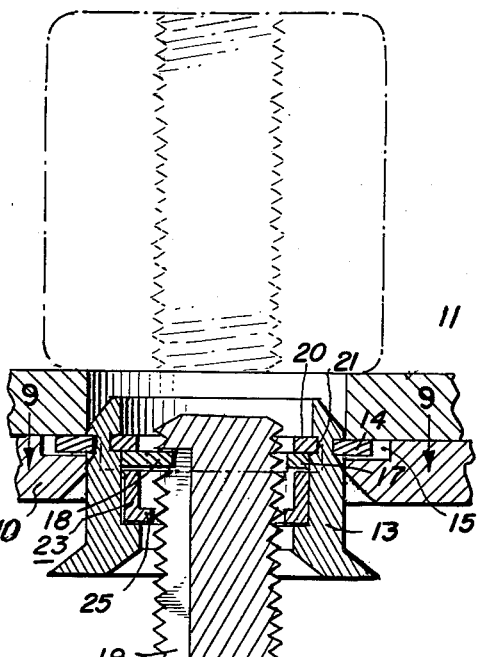
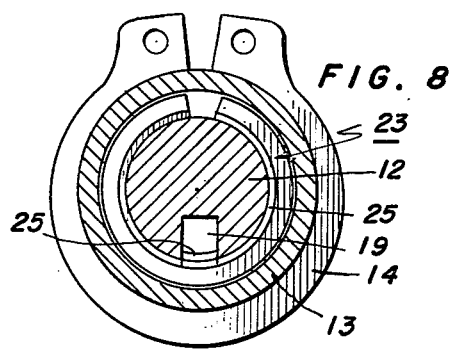
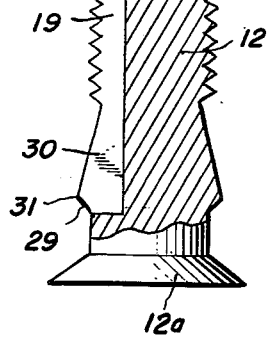
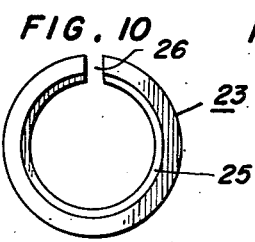
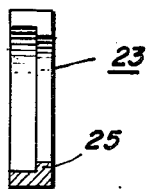
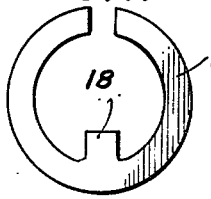
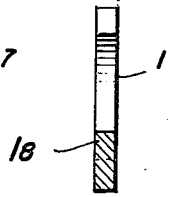
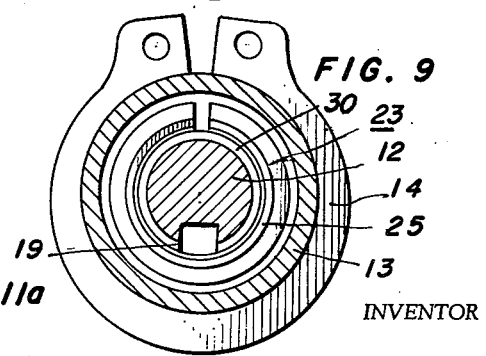
INVENTOR
MELVIN MILLHEISER
BY J. Harold Kilcoyne
ATTORNEY United States Patent Office 3,062,253
Patented Nov. 6, 1962

3,062,253
BOLT AND SHEAR SLEEVE WITH SHEAR SLEEVE RETRACTING MEANS
Melvin Millheiser, Rockaway, N.Y., assignor to Waldes Kohinoor, Inc., Long Island City, N.Y., a corporation of New York
Filed Aug. 26, 1958, Ser. No. 757,271
1 Claim. (Cl. 151—69)

This invention relates to improvements in bolt and nut-type fasteners and more particularly to an improved bolt and shear sleeve assembly for such fasteners used in releasably fastening together sheets or plates in overlying-underlying relationship.

As is well known, it is common practice to fasten metal sheets constituting door panels, access-opening covers and the like, flush against under plates or sheets, such as those making up the wings and fuselage of an aeroplane, by bolt and nut fasteners which are usually of the type wherein both the bolt and nut are held "captive" to the door panel or cover and under plate, respectively. Under certain conditions in operating the aeroplane on the ground and/or during its flight, shear forces between the so-connected panel and under plate may develop, and to protect the bolt against such forces a shear sleeve is employed, such comprising a bushing encircling the shank of the bolt and extending through the aligned panel and plate openings through which the bolt operates.

It has been found that such shear forces are not always completely relieved after the plane has been brought to rest, but instead are partly maintained by friction between the panel and under plate as residual shear forces. Such residual forces of course act on the protective shear sleeve and make it difficult to retract said sleeve from the under plate, sometimes to a degree impeding the unfastening of the panel when such is desired.

Stated broadly, a main object of the invention is to provide a bolt and shear sleeve assembly for fasteners of the described class, whose construction and arrangement is such as to facilitate retraction of the shear sleeve under the residual shear forces developed by friction between the fastened panel and under plate.

A further object of the invention is the provision of a bolt and shear sleeve assembly as aforesaid, characterized in that the retraction of the shear sleeve is effected responsively to initial unthreading of the bolt and with the application of but moderate turning force applied to the bolt.

Another object of the invention is the provision of a bolt and shear sleeve assembly for bolt and nut fasteners employed to secure panels and like sheets flush against under plates or sheets, wherein the bolt and shear sleeve are provided with coacting means for positively and forcefully retracting the shear sleeve from the under plate or sheet with the bolt as the latter is unthreaded from its nut, and thereupon for releasing the bolt from the sleeve as is required to enable the bolt to be fully backed off from said nut.

The above and other objects and features of advantage of a bolt and shear sleeve assembly according to the invention will appear from the following detailed description thereof, in which reference is had to the accompanying drawings, wherein:

FIG. 1 is a longitudinal section taken through a bolt and nut fastener employing the improved bolt and shear sleeve assembly of the present invention and operating to secure a door panel or the like to an under sheet which may comprise a plate or sheet making up the wing or fuselage of an aeroplane, the view illustrating the fastener in fully closed position and showing the nut of the fastener in broken lines;

FIG. 2 is a similar view illustrating the relation of fastener parts upon the bolt having been given an initial turn in unthreading or backing-off direction, it being noted that the shear sleeve is still in the same position as in FIG. 1;

FIG. 3 is a view similar to FIG. 1 but illustrating the shear sleeve in its fully retracted position;

FIG. 4 is a view similar to FIG. 3 which illustrates the manner in which the bolt is enabled to free itself from the shear sleeve for full retracting movement independently of said sleeve;

FIG. 5 is a similar view illustrating the bolt in its fully retracted position with respect to the shear sleeve;

FIGS. 6-9 are sections taken respectively on line 6—6 of FIG. 1, line 7—7 of FIG. 3, line 8—8 of FIG. 4, and line 9—9 of FIG. 5;

FIGS. 10 and 10a are plan and section views, respectively, of a split ring providing the releasable driving connection between the bolt and shear sleeve components of the assembly of such parts illustrated in FIGS. 1–5; and FIGS. 11 and 11a are plan and section views, respectively, of the holding ring employed to hold the bolt captive to the shear sleeve and thereby indirectly to the panel.

Referring to the drawings, reference numerals 10 and 11 designate outer and under plates, sheets or the like (hereinafter for convenience termed the "panel" and "under plate," respectively) which are adapted to be fastened together in overlying-underlying relation by a bolt and nut-type fastener, of which the nut shown in broken lines is of conventional construction and is held captive to its under plate 11 in the usual manner.

The bolt 12 of the fastener operates within a so-called shear sleeve 13 which extends through aligned openings therefor in panel and under plate when the fastener is fully closed, and thus the sleeve functions to protect the bolt against shear forces that may develop between said panel and under plate. By reference to FIGS. 1–5, it will be observed that the axial depth of the shear sleeve 13 is somewhat greater than the combined thickness of the panel 10 and under plate 11, and that its outer end portion preferably has enlarged frusto-conical head formation enabling it to receive the corresponding conically shaped head 12a of the bolt when the latter is screwed home in its nut. It will also be understood that the shear sleeve 13 is adapted to be pushed through the aligned bolt openings of the panel and under plate until its outer end face is flush with the outer face of the panel 10, and accordingly said panel is provided with a conical countersink in its outer face which receives the aforesaid conical head formation of the sleeve when the latter is fully inserted.

Illustratively, the aforesaid shear sleeve 13 is held captive to the panel 10 by an external spring retaining ring 14 housed in a recess provided therefor in the under face of the panel 10 and which extends about the panel opening. Said ring is normally maintained spread by the cylindrical body portion of the shear sleeve as shown in FIG. 6, but it is adapted to contract into a circular groove 16 sunk into the outer periphery of the shear sleeve adjacent its inner end upon said sleeve moving to its full retracted position shown in FIGS. 3–5.

The bolt 12 is held captive to the shear sleeve 13 and thereby indirectly to the front panel 10 by means of a split holding ring 17 (FIGS. 11 and 11a) having an inwardly directed key 18 extending into an axial slot 19 machined or otherwise formed in the shank of said bolt. Thus, the bolt 12 may move axially outwardly from the sleeve 13 until the key abuts the end wall of the slot 19, whereupon full separation of bolt from sleeve is prevented. The aforesaid retaining ring 17 may be secured in place by means of an internal retaining ring 20 seating in a groove 21 provided in the inner bore wall of the shear sleeve.

As has been pointed out above, retracting movement of the shear sleeve 13 out of its opening in the under plate 11 is sometimes impeded because of the residual shear stresses that have developed between the panel 10 and under plate 11 becoming active thereon. According to the present invention, this difficulty is overcome in large measure by the provision of coacting means operative between bolt and shear sleeve for forcefully retracting the shear sleeve from its under-plate opening responsive to initial unthreading of the bolt 12 from its nut.

More particularly, said coacting means includes a thrust-transmitting ring 23 having a cylindrical body portion 24 and an inwardly turned bottom flange 25, said ring being fashioned from spring material and split by means of a short-width gap 26 whereby it is spreadable under pressure exerted radially outwardly on its inner periphery. As seen in FIG. 1, the split ring 23 encircles the shank of the bolt 12 and is contained within the bore of the shear sleeve 13, wherein it is held against axial movement with respect to said sleeve by an inwardly directed sleeve shoulder 28 extending into the sleeve bore near its outer end and by the aforesaid holding and retaining rings 17, 20.

Acting in cooperation with said split ring 23 is a double cam formation on the bolt 12 constituted by two oppositely coned camming portions 29 and 30 formed on an unthreaded length of the shank adjacent the head end of the bolt and which are arranged in adjacency and with their larger-diameter ends meeting along a circular ridge or apex line 31. As best seen in FIGS. 1, 4 and 5, the head-end conical portion 29 is steeply inclined whereas the other or shank-end conical portion 30 is less steeply inclined. By reference to FIG. 1, said circular ridge or apex line 31 between said oppositely inclined portions 29 and 30 is spaced from the head end of the bolt 12 a distance such that it is disposed a slight distance inwardly from the bottom flange 25 of the split ring 23 when the fastening is fully closed, and it is also noted that the diameter of said circular ridge or junction line is greater than that of the circular opening of the split ring 23 as defined by the inner edge of the circular flange 25 thereof.

The operation of the aforesaid bolt and shear sleeve assembly will be briefly explained, with reference being had to FIGS. 1–5 showing the assembly in fully closed relation and thereafter in successive stages of shear sleeve and bolt retraction. Thus FIG. 1 shows the shear sleeve 13 extending the full amount possible into the aligned panel and under plate openings provided for its reception and further shows the bolt 12 to be fully secured home in its associated nut, which latter is assumed to be held captive to said under plate. It will be understood that the split ring 23 is in its normal unstressed or contracted state and that the circular ridge line 31 between the oppositely inclined conical portions 29 and 30 of the cam formation provided on the bolt is spaced inwardly (axially) from the bottom flange of said ring a distance corresponding substantially to the pitch distance between the bolt and nut threads whereby the bolt may be given an approximately full unthreading turn before the steeply inclined conical portion of the bolt cam abuts said bottom flange.

FIG. 2 illustrates the relation of the parts upon the bolt 12 having been broken loose from its nut and unthreaded about a full turn. It will be seen that the bolt has moved a slight distance outwardly with respect to the shear sleeve 13 but that said sleeve has not moved outwardly a corresponding distance due to the assumed holding effect thereon of the residual shear forces developed between panel 10 and under plate 11 to which it is subjected. Also to be noted is that the steeply inclined conical (cam) portion 29 of the bolt has moved axially outwardly into contact with the inturned bottom flange 25 of the split ring 23.

FIG. 3 illustrates the bolt 12 having been unthreaded from its nut a distance as to effect maximum permissible retraction of the shear sleeve 13 from its under-plate opening. Such results from the fact that, as the bolt translates axially outwardly as it is unthreaded, the steeply inclined portion 29 of the bolt abuts the bottom flange 25 of the split ring with a force which is sufficient to thrust or force the sleeve 13 from its under-plate opening while at the same time is less than the force required to spread said split ring and said ring transmits this force to the shear sleeve through engagement of its bottom flange 25 against sleeve shoulder 28. Accordingly, as the bolt is unthreaded, the steeply inclined cam portion 29 of the bolt coacts with the split ring in manner as to effect forceful retraction of the shear sleeve from the under plate 11, the retracting movement of the sleeve continuing until the retaining ring 14 snaps into the sleeve groove 16, whereupon the sleeve is positively held against further retracting movement.

FIG. 4 illustrates the action of the parts occurring upon full retraction of the shear sleeve as aforesaid, accompanied by some further unthreading of the bolt 12. That is to say, upon the shear sleeve being positively held against further retraction as aforesaid, continued unthreading of the bolt results in the cam portion 29 thereof exerting a radial outward spreading force on the inner edge of the inturned bottom flange 25 of the split ring 23, which force is of sufficient magnitude as to spread the ring the amount permitting the ridge formation 31 to move outwardly past said ring bottom flange. When such occurs, the bolt may be turned freely in unthreading direction with respect to the shear sleeve to its maximum retracted position shown in FIG. 5. It will be understood that the maximum retracted position of the bolt as aforesaid is determined by engagement of the key 18 of the holding ring 17 with the inner wall of the slot 19 of the bolt, the key thus holding the bolt captive to the shear sleeve 13 and hence indirectly to the panel 10, as earlier explained.

To re-fasten the bolt, re-fastening operations generally the reverse of those described above are performed. However, it will be understood that in the re-fastening operation it is the engagement of the less steeply inclined conical cam surface 30 of the bolt on the bottom flange 25 of the split ring that effects spreading of the latter as is necessary to full insertion of the bolt 12 with respect to the shear sleeve. Preferably, the split ring is so constructed that its resistance to spread is less than that of the retaining ring 14, and thus the bolt may move or be pushed axially to its final seating within the shear sleeve before the latter moves axially into its opening of the panel 11. Due to the substantially lesser inclination of said conical cam portion 30 as compared to the inclination of the associated cam portion 29 of the bolt, the turning effort required to spread the split ring 25 in the re-fastening operation is of course substantially less than that necessary to spread said split ring when unthreading the bolt for its unfastening.

Without further analysis, it will be appreciated that the bolt and shear sleeve assembly of the invention, when used as intended in a bolt and nut type fastener for securing plates, sheets and the like in overlying-underlying, face-engaging relationship, achieves the objects of the invention as set forth in the foregoing in simple yet effective and thoroughly dependable manner. That is to say, the invention provides coacting means built into the basic shear sleeve and bolt assembly and which is rendered effective in response to unthreading of the bolt from its nut, which unthreading is of course required in any case for disengaging the fastener, for driving or forcing the shear sleeve from its opening in the underlying plate or sheet into which it extends when the fastener is fully secured against residual shear forces likely to be developed between the plates and which tend to prevent retraction. The construction and arrangement of said coacting means is further one in which the pressure or thrust which the bolt exercises on the shear sleeve to drive it from its underplate opening is relatively high because of the ratio of thread circumference to pitch distance between threads of the bolt. Stated in other words, the action of the bolt in driving or thrusting the shear sleeve from its under-plate opening is comparable to the action of a screw jack in imparting axial translation to a nut-type follower wherein a considerable mechanical advantage is obtained by the high ratio of thread circumference to pitch distance between the threads of the screw jack member.

As many changes could be made in carrying out the above constructions without departing from the scope of the invention, it is intended that all matter contained in the above description or shown in the accompanying drawing shall be interpreted as illustrative and not in a limiting sense.

I claim:

In a bolt and nut-type fastener for securing plates and the like in overlying-underlying, face-engaging relationship, a bolt and shear sleeve assembly associated with the overlying plate and comprising a bolt having a head end and a shank which is adapted to be passed through aligned openings in said plates into operative engagement with a nut effective against the under plate, a shear sleeve through which said bolt extends operative in the opening of the overlying plate and having axial length such that it is adapted to project into the opening of the underlying plate thereby to protect the bolt from the effect of shear forces which may develop between the secured plates, coacting means operative between the bolt and shear sleeve for effecting forceful retraction of the shear sleeve from the opening of the underlying plate responsive to withdrawal movement of the bolt from its nut, and means on said shear sleeve for maintaining same coupled to the overlying plate when retracted from the underlying plate as aforesaid, said coacting means including oppositely coned camming portions on the shank of the bolt adjacent its head end, said camming portions being arranged in adjacency and so that their larger-diameter ends meet along a circular apex line and the coned camming portion nearer said head end having greater inclination than the oppositely coned camming portion, a thrust-transmitting member contained in the bore of the shear sleeve in the path of said camming portions, and shoulder means on said shear sleeve extending into said bore for holding said thrust-transmitting member axially fixed with respect to said bore and for transmitting force in axial direction from the bolt to the shear sleeve via the camming portions and thrust-transmitting member, said thrust-transmitting member comprising a split ring encircling the bolt and having an effective diameter less than that of the circle of the apex line along which said coned camming portions meet, whereby said split ring is spreadable by a camming portion moving axially thereagainst, the construction and arrangement being such that the camming portion of greater inclination moves against the split ring with initial unthreading of the bolt and that the camming portion of lesser inclination moves against the split ring when re-fastening of the bolt is being effected.

References Cited in the file of this patent

UNITED STATES PATENTS

| | | |
|---|---|---|
| 2,767,950 | Bellon | Oct. 23, 1956 |
| 2,839,808 | Zahodiakin | June 24, 1958 |
| 2,922,211 | Boyd | Jan. 26, 1960 |
| 2,949,143 | Shur | Aug. 16, 1960 |
| 2,972,367 | Wootton | Feb. 21, 1961 |